Oct. 30, 1956 E. F. RIESING 2,768,849

FLUID SEAL

Filed Dec. 5, 1952

INVENTOR.
ELLWOOD F. RIESING
BY
Willits, Hardman & Fehr
ATTORNEYS

United States Patent Office 2,768,849

Patented Oct. 30, 1956

2,768,849

FLUID SEAL

Ellwood F. Riesing, Dayton, Ohio, assignor to General Motors Corporation, Detroit, Mich., a corporation of Delaware Application December 5, 1952, Serial No. 324,326

1 Claim. (Cl. 288—3)

This invention relates to fluid seals and is particularly concerned with fluid seals of the radial type which include guard rings.

It is an object of the present invention to provide a fluid seal in connection with a rotating member wherein the seal is held within a cavity of a housing member and seals preferably around the rotating member through the conjoint action of the resilient material used in the seal and a garter type spring used to increase the radial pressure against the rotating member, an integral guard ring being provided in connection with the seal for enclosing and for protecting the spring during use of the seal.

A further object of the present invention is to provide a fluid seal of the type described in the aforegoing object wherein the guard ring is forced into closed relation with another portion of the seal through the use of an annular locking ring.

Further objects and advantages of the present invention will be apparent from the following description, reference being had to the accompanying drawing, wherein preferred embodiments of the present invention are clearly shown.

Radial type seals of varying designs are disclosed in my copending applications, Serial Nos. 324,324, 324,325 issued February 28, 1956, now U. S. Patent 2,736,586, and 324,327 now U. S. Patent 2,736,584, issued February 28, 1956. In these applications, seals are shown which include reinforcing members for holding the shape of the seal and which also include a garter spring for improving the sealing properties of the assembly when installed between a housing and a shaft.

The present invention is directed to a radial type seal wherein a guard ring is utilized which is molded integrally with the body of the seal and which may or may not be in direct contact with the garter spring.

The function of this guard ring is to prevent the garter spring from becoming displaced from its positioning groove in the sealing lip. Such a condition often arises through vibration or unbalance of the rotating member whereby inertia forces either alone or in conjoint action, causes the spring to become displaced from its receiving groove. When this occurs, the sealing value of the entire unit is markedly reduced.

The guard ring has another very useful function in that it prevents the ingress of dirt, and mud or abrasive materials into the garter spring receiving groove whereby the efficiency of the garter spring is maintained high due to the elimination of extraneous and deleterious materials.

In the past, the function of a guard ring has been obtained through the inclusion of a metal ring which snaps into the seal assembly and which, in many cases, does a satisfactory sealing job but which, in others, due to distortion or vibration thereof, fails to perform the desired function and which, due to its rigidity, often reduces the efficiency of the seal.

Figure 1:
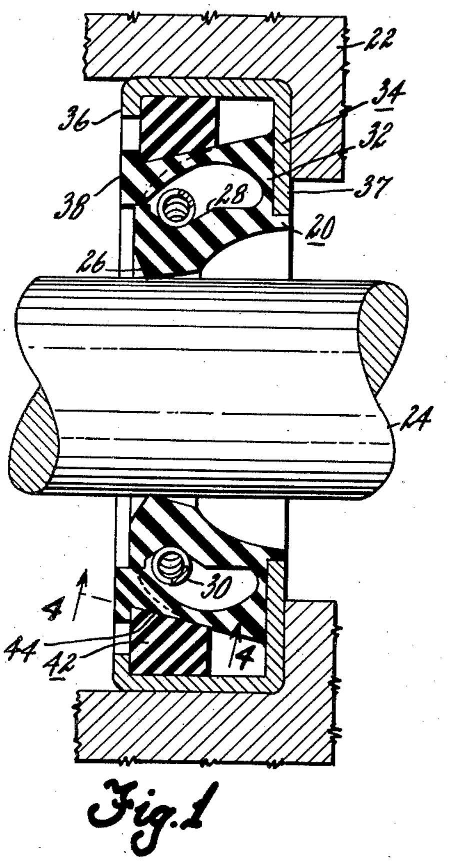
Fig. 1 shows a cross section of one type of seal as described herein utilizing a guard ring.
Figure 4:
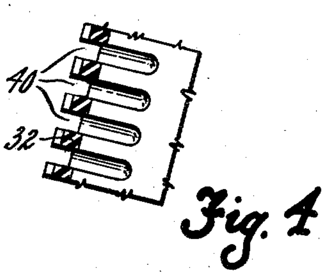
Fig. 4 is a view taken on line 4—4 of Fig. 1.

Referring specifically to Fig. 1, an embodiment of this structure is shown wherein a seal 20 is provided between a housing 22 and a rotatable shaft 24. The seal 20 includes a sealing lip 26 having a groove 28 of annular shape therearound which receives a garter spring 30 that radially compresses the lip 26 into sealing engagement with the shaft. The main body 32 of the seal is bonded to an annular metallic retainer 34 which is of generally U-shaped cross section and which includes a short inturned lip 36 and a longer lip 37 in opposed relation thereto. The body 32 of the seal 20 also includes an elongated flexible lip 38 which is grooved as shown in Fig. 4 to include a plurality of spaced grooves 40. The grooves 40 permit the lip 38 to be capable of smooth, radial compression inwardly so as to eventually close the cavity in the seal 20 which includes the garter spring 30. The sealed position is shown in Fig. 1.

In order to hold the lip 38 in contact with that portion of the seal adjacent the groove 28, an annular snap ring 42 is provided which has an angled face 44 thereon that becomes contiguous with the outer surface of the lip 38 when the seal is in the position shown in Fig. 1. The snap ring 42 is snapped past the inturned flange 36 and thereby seals the garter spring against deleterious materials seeping or creeping into the spring groove 28. It is noted that the metallic seal retainer 34 is a press fit within the housing 22.

Figure 2:
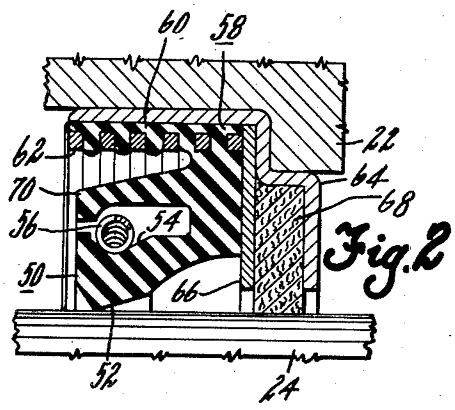
Fig. 2 is a view of a modified design of seal wherein a reinforcing element is provided within the seal.

Fig. 2 shows a modification of the device wherein the shaft 24 is to be sealed from a housing 22 by means of a seal 50. The seal 50 includes a sealing lip 52 having an annular groove 54 therearound to receive a garter spring 56. The body portion 58 of the seal 50 includes an annular flange 60 therearound into which is molded and bonded a spring 62 of any desired configuration. The spring 62 maintains the annular shape of the flange 60 and permits insertion of the seal 50 into a metallic retaining cup 64. One side of the seal 50 is preferably bonded to a metallic washer 66, which, when the seal is in position in the cup 64, forms an annular groove therebetween. Into this groove is placed an annular washer 68 made of Teflon, nylon, fabric reinforced material or other suitable material, which washer 68 is preferably a rubbing fit against the shaft 24 to prevent ingress of mud, dirt, etc., toward the sealing lip 52.

In this design, the spring 56 is held in position by a second flange-like lip 70 which extends outwardly from the body 58 of seal 50. This lip does not necessarily contact the sealing lip but is molded so that the annular space therebetween is less than the diameter of the spring 56 whereby the spring 56 is maintained in its position within groove 54. The spring may be pressed into the groove 54 by merely flexing the lip 70 outwardly. This type of seal is very effective in many installations. The cup or retainer 64 is preferably a press fit into the housing 22. It is understood that in this structure, the washer 68 should be assembled in the cup 64 prior to the insertion of the seal 50 therein, which seal 50 is a tight press fit within the retainer 64. The spring-like reinforcements 62 within the seal 50 prevents distortion of the seal and maintains the seal in good efficient condition throughout its period of use. Modifications include a snap groove for receiving the washer or the washer may be assembled prior to the molding operation when the material permits.

Figure 3:
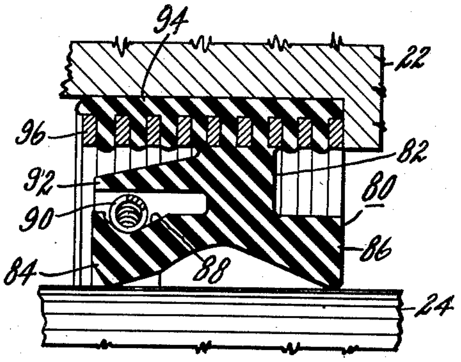
Fig. 3 is still another modification of the seal utilizing a double sealing lip together with the guard ring.

Fig. 3 shows still another modification of design which is very similar to that shown in Fig. 2 in some respects. In this instance, a seal 80 is utilized to seal the shaft 24 from the housing 22. The seal includes a main body portion 82 having oppositely disposed sealing lips 84 and 86 extending therefrom. The lip 84 includes a groove 88 therein adapted to receive an annular garter spring 90. A guard ring 92, extending from the body portion 82, is disposed so as to prevent the spring 90 from being displaced from the groove 88. The body 82 also includes an annular flange 94 thereon which has molded therein and bonded thereto a spring 96 which acts as a reinforcement to prevent distortion of the annular flange 94.

In this embodiment the sealing lip 86 acts in a similar manner to the washer 68 described in connection with Fig. 2, since the sealing lip 86 resiliently rides against the shaft 24 to prevent mud or dirt from migrating toward the sealing lip 84 and also improving the sealing function. The embodiment also differs from the previous embodiments since no retaining cup is used and the seal is merely pressed within the housing 22 so as to be radially compressed therein into tight sealing relation therewith.

It is apparent that any of the seals described herein may be made from any suitable elastomeric material wherein the seal has sufficient resiliency to permit proper insertion and proper sealing functions. Butadiene-acrylonitrile copolymers, polyacrylates, polychloroprene, butadiene-styrene copolymers, natural rubber and mixtures thereof may all be used compatible with the application of the seal. In other words, if the seal is to be used to prevent grease or oil from seeping along the shaft, it is important that the material used therein be resistant against destruction by such materials. On the other hand, if the seal is used to prevent the migration of water or aqueous solutions, natural rubber provides a very satisfactory material. It is to be understood that my invention is in no way limited to the specific material used within the seal and that in this instance any suitale elastomeric compound will be satisfactory.

While the embodiments of the present invention as herein disclosed, constitute preferred forms, it is to be understood that other forms might be adopted.

What is claimed is as follows:

A fluid seal of the radial type adapted to seal a rotating member from a non-rotating member the combination comprising; an axially elongated elastomeric body portion having a sealing lip integrally molded thereto through a diaphragm portion, a coil spring having spaced convolutes molded within said body, a metal washer having an internal diameter greater than that of the rotating member, one radial side of said main seal body being bonded to a radial side of said metal washer, a garter spring encircling said sealing lip and adapted to distort said sealing lip into engagement with the rotating member, a retaining cup having a centrally disposed aperture of greater diameter than that of the rotating member receiving said main sealing body portion, said coil spring extending axially along said body portion in substantial juxtaposition to the axial wall of said retaining cup and being operative to compressibly and removably support said main seal body within the retaining cup, and a sealing washer held between said metal washer and the base of said retaining cup and adapted to bear on said rotating member in a position spaced from said sealing lip.

References Cited in the file of this patent

UNITED STATES PATENTS

| | | |
|---|---|---|
| 1,849,404 | Leonard | Mar. 15, 1932 |
| 2,080,670 | Nelson | May 18, 1937 |
| 2,114,908 | Peterson | Apr. 19, 1938 |
| 2,207,371 | Blackmore et al. | July 9, 1940 |
| 2,330,104 | Antonelli | Sept. 21, 1943 |
| 2,385,156 | Newell | Sept. 18, 1945 |
| 2,397,847 | Dodge | Apr. 2, 1946 |
| 2,430,445 | Aamodt et al. | Nov. 11, 1947 |
| 2,437,901 | Winkeljohn | Mar. 16, 1948 |
| 2,651,534 | Kosatka | Sept. 8, 1953 |

FOREIGN PATENTS

| | | |
|---|---|---|
| 556,441 | Great Britain | Oct. 5, 1943 |